United States Patent

Pinschmidt, Jr. et al.

[19]
[11] Patent Number: 5,086,111
[45] Date of Patent: Feb. 4, 1992

[54] AMINE FUNCTIONAL POLYMERS CONTAINING ACETAL GROUPS

[75] Inventors: Robert K. Pinschmidt, Jr., Allentown, Pa.; Ta-Wang Lai, Taipei, Taiwan

[73] Assignee: Air Products and Chemicals, Inc., Allentown, Pa.

[21] Appl. No.: 525,377

[22] Filed: May 17, 1990

[51] Int. Cl.$^5$ ............................................... C08F 8/00
[52] U.S. Cl. ........................................ 525/61; 525/60
[58] Field of Search ................................. 525/61, 60

[56] References Cited

U.S. PATENT DOCUMENTS

| | | | |
|---|---|---|---|
| 4,393,174 | 7/1983 | Dawson et al. | 525/369 |
| 4,421,602 | 12/1983 | Brunnmueller et al. | 162/168.2 |
| 4,490,557 | 12/1984 | Dawson et al. | 564/159 |
| 4,774,285 | 9/1988 | Pfohl et al. | 525/60 |
| 4,843,118 | 6/1989 | Lai et al. | 524/555 |

OTHER PUBLICATIONS

Lindemann, "Encylopedia of Chemical Technology", Kirk-Othmer, vol. 14, pp. 208-239 (1971).

*Primary Examiner*—Joseph L. Schofer
*Assistant Examiner*—T. M. Reddick
*Attorney, Agent, or Firm*—Russell L. Brewer; James C. Simmons; William F. Marsh

[57] ABSTRACT

Polyvinylaminals, optionally as the formed copolymer with polyvinylhemiaminals, and polyvinylacetals are useful as flocculants and epoxy resin and polyurethane crosslinking agents and are provided by reacting a poly(vinylamine) or a copolymer containing vinyl alcohol and vinylamine units with a monoaldehyde. The aldehyde, such as butyraldehyde, can be introduced in the polymer acetalization as a liquid or gas, generally in a proportion of about 0.02 to 0.5 mol per mol of alcohol and amine units in the polymer chain.

9 Claims, 1 Drawing Sheet

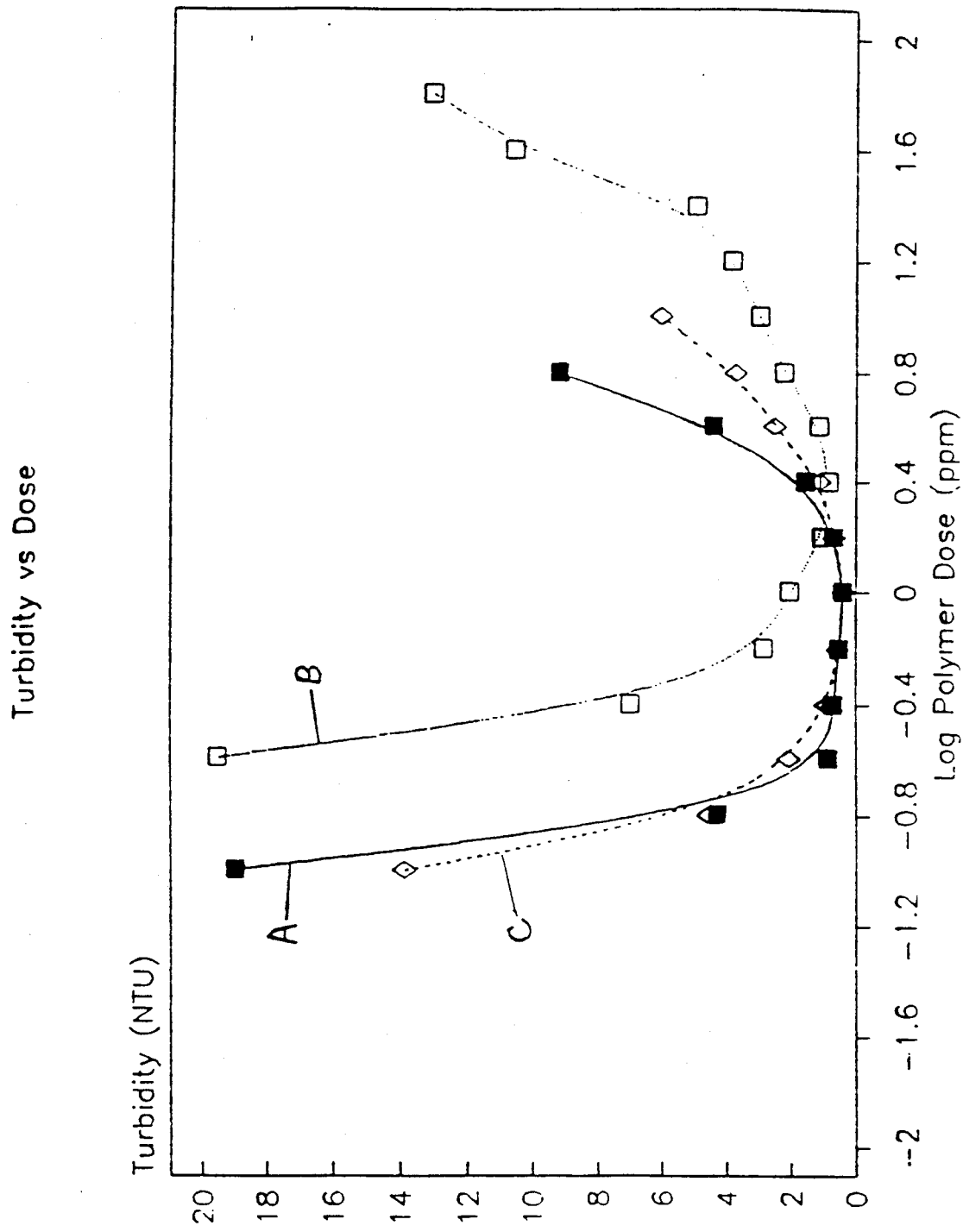

AMINE FUNCTIONAL POLYMERS CONTAINING ACETAL GROUPS

FIELD OF INVENTION

This invention relates to a polymer containing both amine and aminal and optionally acetal functionality. Additionally, it relates to polymers prepared by reacting precursor polymers containing aminal and optionally alcohol functionality with aldehydes.

BACKGROUND OF THE INVENTION

Polyvinyl acetals are commercially valuable resins used as interlayers for safety glass, in adhesives, as epoxy resin plasticizers and as wash primers. They are derived from the reaction of poly(vinyl alcohol) with aldehydes, but can be prepared by a one-step process in which a poly(vinyl ester) such as poly(vinyl acetate), is simultaneously saponified and acetalized.

The properties of polyvinyl acetals depend upon the method of preparation and the proportion of residual unhydrolyzed ester groups, the number of alcohol groups and the percentage of acetal moieties contained in the polymer. For example, in the preparation of safety glass, a polyvinyl butyral is used having a small amount of vinyl acetate, about 9% of vinyl alcohol groups, and about 70-80% of vinyl butyral groups. Polyvinyl butyral L resins used in wash primers have about 2-3% of residual vinyl acetate in the polymer. Other applications, such as in specialty adhesives, textile coatings or strippable coatings require different polymer compositions.

One method of modifying the properties of polyvinyl acetals has been to change the functionality of monomers making up the polymer, such as employing a co-monomer with the vinyl alcohol monomer, such as acrylonitr vinyl chloride, acrylate and the like. A discussion of polyvinylacetals and such modification using acetalized vinyl alcohol copolymers is given by Lindemann. Encyclopedia of Polymer Science and Technology. Volume 14 pages 208-239 (1971). It is desirable however to improve on the forms and functionality of polyvinylacetals in order to increase their Amine functional polymers are valuable as a cost effective way of incorporating cationic charge into polymers useful in cationic electrocoating, water treatment, and enhanced oil recovery (EOR). U.S. Pat. No. Lai et al. (1989) discloses the use of high molecular weight ($>1 \times 10^6$) poly(vinylamines) in acidized fracturing fluids for EOR. Such poly(vinylamines) can be prepared by acid or base hydrolysis of poly(N-vinylformamide). Although the high molecular weight poly(vinylamines) can be used in EOR without crosslinking, the use of crosslinking agents, such as epichlorohydrin, hexamethylene diisocyanate and glyoxal, is disclosed as optional The use of a dialdehyde. such as glyoxal, to crosslink poly(vinylamine) is also disclosed in Japanese Patent Publication No. J61051006 (1986).

SUMMARY OF THE INVENTION

We have found that polyvinyl aminals and polyvinylacetals containing amine functionality can be prepared by reacting either poly(vinylamine) or a copolymer of vinyl alcohol and vinylamine with a monoaldehyde. The incorporation of amine functionality improves the adhesive qualities of the polymer and increases crosslinking efficiency with epoxy and urethane polymers. The polymers can also be used as flocculants and in emulsifiers and as protective colloids.

According to our invention, an amine functional polymer containing acetal and aminal groups is provided with monomeric units randomly joined in the proportions and with the structures indicated by the general formula I.

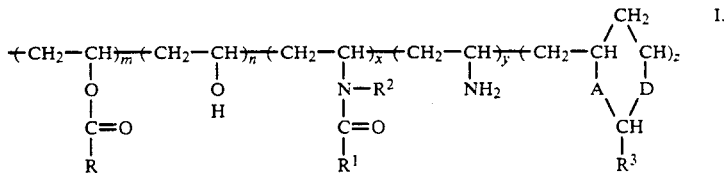

wherein m, n, x, y and z are integers which added together equal a sum,
m is 0 to 15 percent of said sum,
n is 0 to 94 percent of said sum,
x is 0 to 30 percent of said sum,
y is 1 to 95 percent of said sum,
z is 5 to 80 percent of said sum;
A and D are each 0, NH or NCH3,
R is H, $C_1$-$C_{11}$ alkyl, phenyl or -$CF_3$,
$R_1$ is H or methyl,
$R_2$ is H or $C_1$-$C_4$ alkyl or hydroxyalkyl, and
$R_3$ is H, $C_1$-$C_{20}$ alkyl, phenyl, or hydroxyphenyl

BRIEF DESCRIPTION OF THE DRAWINGS

The single FIG. is a graph of Turbidity vs. Dose to compare the flocculation performance of a polymer of the present invention with that of prior art polymers.

DETAILED DESCRIPTION OF THE INVENTION

Polyvinylaminals and amine functional polyvinylacetals are prepared according to our invention by condensation of either a poly(vinylamine) homopolymer (PVAm) or a polyvinyl alcohol/polyvinyl amine copolymer (PVOH/PVAm) with aldehydes in the presence of an acid catalyst. The compounds (generically polyvinylacetals) which are thus prepared can exist either as a salt free, amine functional form or, depending upon the pH of the solution, as a cationic ammonium polyvinylacetal. It is to be understood that the description and reference to our polyvinylacetals, unless otherwise indicated, includes both the salt free, amine functional polymer and the cationic ammonium salt.

The acetalization processes which can be used to prepare amine functional polyvinylacetals according to our invention, are similar in procedure to the processes disclosed by Lindemann (see above) for preparing polyvinylacetals from polyvinyl alcohol. These include homogeneous. heterogeneous, precipitation and dissolution methods. Among these, it is preferred to use the homogeneous method for preparing the amine functional polyvinylacetals in order to increase the degree of acetalization and obtain a more uniform distribution of the intramolecular acetal groups. This method consists of the following steps:

(a) dissolving PVOH/PVAm or PVAm in a water-alcohol mixture.
(b) dissolving aldehyde and an acid catalyst in alcohol at 0. to 20° C. in a separate reaction vessel.
(c) mixing solutions of PVOH/PVAm or PVAm and aldehyde together with vigorous stirring.
(d) heating the resulting solution at temperatures of about 30 to 80° C. for 0.5 to 5 hours.
(e) recovering amine functional polyvinylacetal by adjusting the solution pH to >10 with caustic such as NaOH or KOH, to cause precipitation of the polymer.

The polymers which are reacted with aldehydes in order to prepare the amine functional polyvinylacetals are either poly(vinylamines) or copolymers of vinyl alcohol and vinylamine. These polymers can be represented the following general formula II which indicates the structure and proportions of the monomer units but not their order because the copolymeriz is random.

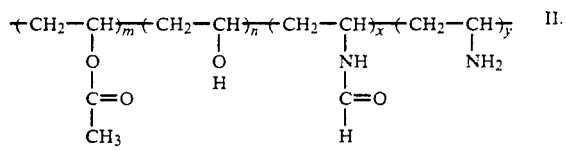

wherein m, n, x and y are integers which added together equal a sum, m is 0 to 15 percent of said sum, n is 0 to 99 percent of said sum, x is 0 to 30 percent of said sum and y is 1 to 100 percent of said sum. Such polymers can be formed by the hydrolysis of poly(N-vinylamides) or copolymers of vinyl esters, e.g. vinyl acetate, and N-vinylamides, e.g. N-vinylformamide. It is acceptable for unhydrolyzed moieties of both the ester and amide groups to remain in the polymer as indicated by the above structural formula, but preferably the amount of remaining ester groups will not exceed 2 mol% of the monomer units in the polymer and the number of unhydrolyzed amide groups will not be over 30 mol%. of the amide groups A preferred method of preparing copolymers of vinyl alcohol and vinyl amine includes the following steps:

(a) continuously feeding vinyl acetate monomer and N-vinylformamide monomer into a reaction mixture in a reaction vessel, copolymerizing the vinyl acetate monomer and N-vinylformamide to yield poly(vinyl acetate)-co-poly(N-vinylformamide) [PVAc/PNVFl in the reaction mixture,
(c) continuously withdrawing from the reaction vessel reaction mixture containing the PVAc/PNVF,
(d) hydrolyzing the acetate functionality of the PVAc/PNVF in a methanolic medium to yield a vinyl alcohol copolymer as a gel swollen with methanol and methyl acetate,
(e) comminuting the gel to give a particulate copolymer product and optionally rinsing with methanol,
(f) hydrolyzing the copolymer particles as a slurry in methanol with acid or base to give PVOH/PVAm particles, and optionally but preferably.
(g) washing the particulate PVOH/PVAm with methanol to remove soluble salts and by-products and removing the solvent from the copolymer product, especially by vacuum or thermal stripping.

Although the preferred vinyl ester used in making these copolymers is vinyl acetate, other vinyl esters such as the vinyl esters of formic acid and $C_3$–$C_{12}$ alkanoic acids, benzoic acid or trifluoroacetic acid can be used while N-vinylformamide is the preferred vinylamide monomer, other vinylamides such N-vinylacetamide or vinylamides in which the nitrogen is substituted with a methyl group or other alkyl or hydroxyalkyl groups containing 1 to 4 carbon atoms can be used. N-vinylcarbamates O-t-alkyl-N-vinylcarbamates may also be used.

The polymers used in the invention are prepared by a free radical continuous or batch polymerization process. The continuous process gives more uniform molecular weight distribution and uniformity of comonomer incorporation (i.e. a substantially random homogeneous copolymer), improves t lot-to-lot uniformity and offers the commercial advantages of continuous operation. The batch process allows production in simple batch equipment and can be carried to high conversion to avoid monomer stripping.

Suitable free radical initiators for the polymerization reaction include organic peroxides, such as t-butyl peroxypivalate, di(2-ethyl-hexyl) peroxydicarbonate, t-butyl peroxyneodecanoate and 2,2'butyronitrile. The concentration of the initiator in the polymerization reaction mixture normally ranges from 0.0001-2 wt%, the preferred conconcentration being 0.001-0.5 wt%.

Preferably the polymers are prepared using a train of continuous stirred tank reactors followed by a hydrolysis, or alcoholysis, reaction. Vinyl acetate, N-vinylformamide, free radical initiator and methanol are added continuously to the first reactor. The N-vinylformamide comonomer can be added to subsequent reactors in order to maintain a homogeneous copolymer. Also N-vinylformamide can be homopolymerized to form poly(N-vinylformamide), (PNVF), in aqueous or organic or mixed solvents.

In the copolymer process unreacted vinyl acetate is removed from the exit stream by contacting it with methanol vapors in a stripping column yielding an intermediate vinyl acetate random copolymer [PVAc/PNVF] having the general formula III.

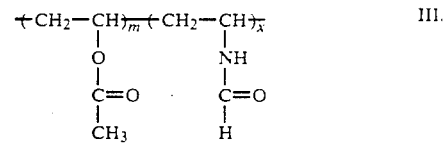

wherein m 1-99 mole% and
x 1-99 mole%.

A suitable process for preparing the PVAc/PNVF and subsequent hydrolysis to PVOH/PNVF is essentially like the process described in U.S. Pat. directed to vinyl alcohol/poly(alkyleneoxy) acrylate copolymers, the disclosure of which is hereby incorporated by reference.

Stripping of unreacted vinyl acetate is most conveniently done for continuous processes by countercurrent contacting of the polymer paste so with hot solvent. Stripping can be avoided by fully converting the monomers as in many batch processes. N-vinylformamide or other vinyl amides are more difficult to remove from the solution polymer, but their higher reactivity than vinyl acetate in the polymerization and frequently lower levels of incorporation minimize the amounts of these monomers present in the final product.

The polymers used in the invention can also contain other comonomers, such as for example, (meth)acrylate, crotonate, fumarate or maleate esters, vinyl chloride, ethylene, N-vinylpyrrolidone, and styrene in amounts ranging from about 2 to 20 mole%.

The hydrolysis of the PVAc/PNVF can be conducted batch or continuously with acid or base catalysis in various solvents. It is most conveniently done in methanol, optionally with various levels of water, via base catalyzed transesterification. The reaction gives methyl acetate as a volatile coproduct and PVOH copolymer as a solvent swollen but insoluble separate phase. The level of PVAc hydrolysis is adjusted by varying the base addition level and reaction time, but becomes essentially complete during base initiated PNVF hydrolysis in the subsequent step.

The transesterification solvent (for example methanol) level can be varied over wide ranges which should exceed the amount required by reaction stoichiometry and preferably provide sufficiently low viscosity for efficient mixing of added catalyst and for heat removal. Desirably, a powdery product is obtained directly in a batch hydrolysis using a vessel with efficient stirring by adding large amounts of methanol, for example a 10-fold excess over PVAc copolymer, but high levels of methanol give lower polymer throughput or require larger equipment. Continuous hydrolysis of copolymer base can be conveniently practiced at 20-60% polymer solids by mixing the base catalyst with the alcohol solution of the copolymer and extruding the mixture onto a moving belt, much as is done commercially for the preparation of PVOH homopolymer. The hydrolyzed polymer in the form of a methanol/methyl acetate swollen gel is then ground and can be rinsed with fresh methanol to remove catalyst residues and methyl acetate. The resulting methanol swollen polymer can then be dried or preferably, used as is in the subsequent PNVF hydrolysis step. The PVOH/PNVF has the following general formula IV.

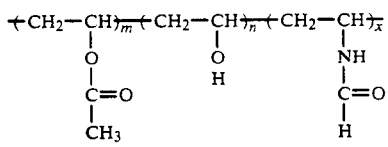

IV where m is 0-15 mole%, preferably 0-2 mole% for subsequent base hydrolysis to the vinylamine copolymer, n is 1-99 mole%, and x is 1 to 99 mole%.

The hydrolysis of PNVF to PVAm or PVOH/PNVF to PVOH/PVAm can be accomplished by base or acid hydrolysis. Base hydrolysis, preferably with alkali hydroxide (NaOH or KOH) or alkaline earth hydroxide, requires 0.7 to 3 times, preferably 1 to 1.5 times, stoichiometric quantities based on PNVF, and is best conducted at elevated temperatures (50-80° C.). The base or acid hydrolysis reaction can be accomplished in aqueous solution. In this case the product is recovered by precipitation or solvent evaporation. A two phase hydrolysis as a slurry of methanol swollen PVOH/PNVF particles in methanol is also possible. The two phase reaction is initially fast, but slows down after partial conversion, probably reflecting slow reaction with less accessible formamide groups. Conversion after 24 hours is about 85% but can be raised to 93% by adding small amounts of water in amounts of 1 to 20wt%, based on methanol. The slurry can comprise 10 to 65 wt%, preferably 20 to 50 wt%. polymer particles in methanol. Contemplated as the functional equivalent of methanol as the liquid medium of the slurry are $C_2$-$C_6$ alkyl alcohols and diols and $C_4$-$C_8$ alkyl ethers. The methanol can also contain methyl acetate from the hydrolysis of any remaining PVAc component. The two phase hydrolysis has the advantage that the products can be separated from the liquid phase, rinsed, and dried to produce a salt-free primary amine functional polymer in a commercially practical process.

The poly(vinylamine) homopolymer can be prepared in like manner using N-vinylformamide as the sole monomer with subsequent hydrolysis of the amide groups to the amine functionality. As discussed in formation of the copolymer, other amides such as N-vinylacetamide, can also be used in forming the homopolymer.

Synthesis of the copolymers by copolymerization of vinyl acetate and vinylformamide with subsequent hydrolysis to the polyvinyl alcohol/polyvinyl formamide and further hydrolysis to the polyvinyl alcohol/polyvinyl amine, copolymer, is described in the copending applications Ser. Nos. 181,873 and 181,BB7, both filed Apr. 15, 1988.

The amine functional polymers used in this invention have a weight average molecular weight of about 10,000 to 7 million, and preferably from 15,000 to 600,000.

In preparing the polyvinylacetals it is preferred that the concentration of copolymer or homopolymer be about 5 to 40 wt.% in a mixture. The alcohols which are used are alcohols having 1 to 6 carbons preferably the $C_1$-$C_4$ alcohols and the concentration of alcohol can vary from about 5 to 70 wt.% of the water alcohol mixture, but is preferably about 10 to 30 wt%.

Suitable aldehydes for preparing the amine functional polyvinylacetals are monoaldehydes which include aliphatic aldehydes such as formaldehyde, acetaldehyde, butyraldehyde. 2-ethyl hexaldehyde and the like, aromatic aldehydes such as benzaldehyde, and substituted aromatic aldehydes such as the hydroxy substituted aromatic aldehyde, salicylaldehyde.

The concentration of the aldehydes in the acetalization mixture is about 0.02 to 0.5. preferably 0.05 to 0.4, mol of aldehyde per mol of vinylalcohol and vinylamine units in the polymer chain. The aldehyde can be introduced either as a liquid or as a gas.

Suitable acid catalysts for preparing the acetals are the mineral acids such as hydrochloric acid, sulfuric acid. phosphoric or perchloric acids and organic acids such as acetic, trifluoroacetic, aryl sulfonic and methane sulfonic acids. The concentration of the acid catalyst is from about 0.001 to 20%, preferably 1 to 5% based on the weight of the polymer being acetalized.

Reaction temperatures for the acetalization can range from about 20 to 120° C. but preferably the temperature is about 30 to 80° C. Reaction times can run from 0.5 to 10 hours or more, but preferably the reaction will be complete in 0.5 to 5 hours.

In the homogeneous method which is preferred, the reaction is carried out in aqueous solution of the polymer and a solvent for the polyvinyl acetals which is miscible with water is added either initially or continuously during the acetalization in order to prevent precipitation of th polymer. A heterogeneous method can be used, however, in which the polymer is present either as a powder or a film. The reaction can also be carried out in a homogeneous phase initially, but with the polymer precipitating at about 30% acetalization and at that point the reaction is continued using the heterogeneous system. Another procedure is referred to as the dissolution method in which the reaction is initially in a heterogeneous syst with the polymer powder suspended in a solvent which then dissolves the aldehyde and the final product.

In the formula I given above for the structure of the polymer, the acetalized portion of the polymer is formed from two of the monomer units derived from either the alcohol or the amine units. The reaction with the aldehyde occurs with the polymer on adjacent monomer units involving either hydroxy or amine functionality. The most common form of the acetalized unit will be where in the formula I the atoms represented by A and D are both either oxygen or NH, but it should be understood that units can also be present in which either A or D is oxygen and the other A or D in the unit is NH.

In order to describe our invention further, the following examples are presented which should be construed as illustrative only and not to limit unduly the scope of the invention.

EXAMPLE 1

This example demonstrates a polymerization process for making the copolymer PVAc/PNVF. A continuous polymer paste process was followed for making PVAc/PNVF using two 2.000 ml jacketed reaction vessels and a surge vessel with bottom outlets and a methanol stripper column. Each reaction vessel was equipped with a stirrer, feed lines, thermocouple, nitrogen sparge line and reflux condenser. The reaction vessels were connected in series by a gear pump with variable speed motor. The methanol stripper was a 70 cm × 75 mm column, containing 8 × 8 mm Raschig rings in the top two thirds and 6 × 6 mm Raschig rings in the bottom third. At the top of the column was a take-off condenser and a methanol boiler was connected to the bottom of the column. Table 1 shows the initial charges that were added to reactors I and II for preparation of a copolymer containing 6 mol percent PNVF (PVAc/6% PNVF). Continuous feeds 1. 2 and 3 were added to reactor I and feed 4 to reactor II at the hourly feed rates shown in Table 1. When the reactor temperatures approached 60° C, the feeds were begun. The flow rates from reactor I to reactor II and from reactor II to the paste collecting port were adjusted to maintain reactor I and reactor II levels. Free monomer (vinyl acetate and N-vinylformamide) in reactors I and II was monitored periodically by a titration method. Percent unreacted N-vinyl formamide was determined by gas chromatography. The amount of catalyst added into reactor I was varied to adjust percent vinyl acetate at steady state.

Once initial equilibrium was achieved, polymer paste was collected. To maximize paste yield at the end of a sequence, reactor I was cooled to ambient and its feeds were discontinued but the feeds (including from reactor I) to reactor II were maintained. When reactor I was empty, the feed to reactor II was discontinued and the contents of reactor II were cooled and commingled with prime material.

Paste was poured or pumped continuously into the surge vessel and pumped to the top of the heated methanol stripper for removal of vinyl acetate. The paste was restripped as necessary to achieve a vinyl acetate level below 0.1%.

TABLE 1

| Initial Charges (g) | Reactor I | Reactor II |
|---|---|---|
| N-vinylformamide (75% Basis) | 21.3 | 7 |
| Vinyl acetate (distilled) | 460 | 248 |
| Methanol | 1.001 | 1.048 |
| Lupersol 10* | 0.12 | 0.12 |
| Tartaric Acid | 0.02 | 0.02 |
| Feeds | g/h | mL/h |
| 1. Vinyl acetate (dist.) | 370 | 440 |
|    N-Vinylformamide (Dist., 75%) | 21.3 | |
| 2. Methanol | 150 | 190 |
|    Lupersol 10 | 0.43 | |
| 3. Methanol | 107 | 135.5 |
|    Tartaric acid | 0.012 | |
| 4. Vinyl acetate (Dist.) | 12 | 12.35 |

*Lupersol 10 is t-butylperoxyneodecanoate available commercially from Penwalt Corp.

Reactor temperatures were 60–63° C. throughout the polymerization. A higher molecular weight PVAc/6% PNVF paste was collected after initial equilibration when the concentration of vinyl acetate was 30–43% in reactor I and 22–35% in reactor II by titration.

"Prime" PVAc/6% PNVF paste was collected as the free monomer concentration approached 20% in reactor II. Using a catalys Feed 2, free monomer was 28 to 30% in reactor I and 16 to 19% in reactor II. Percent unreacted NVF was about 0.76% in reactor I and 0.22% in reactor II. Analysis of the polymer by nmr showed a PNVF:PVAc ratio of 1/16.1, i.e. 6.2%

EXAMPLE II

This example demonstrates the hydrolysis of PVAc/PNVF to PVOH/PNVF and the subsequent hydrolysis to PVOH/PVAm.

In general, PVAc/PNVF paste was added to a flexible plastic bag. KOH (0.01 eq. on VAc) dissolved in methanol was added to the bag with thorough mixing. The bag was sealed and heated at 60° C in a water bath for 15 minutes, precipitating the polymer as a white rubbery slab.

The PVOH/PNVF "slab" was mechanically ground into small pieces. the ground polymer was added to a round-bottom flask equipped with mechanical stirrer, temperature controlled heating mantle, nitrogen blanket, thermometer, and condenser. Methanol was added to the flask to give about 15% polymer slurry by weight. (An attempt to hydrolyze PVOH/PNVF in methanol containing 10% deionized water resulted in slightly higher percent hydrolysis.) KOH (1.2 eq. on NVF) dissolved in methanol was added to the slurry. The slurry was stirred vigorously and heated to reflux (63° C) for 12 hours after which the slurry was cooled to ambient, filtered, washed with methanol and dried at 60° C. under house vacuum.

Hydrolysis of PVAc/6% PNVF to PVOH/6% PNVF. KOH (0.0045 g; 0.0001 mol; 0.04 mol% on VAc) was dissolved in 5 mL of methanol and added to PVAc/6% PNVF paste (50 g paste., 18.5 g of solid., 0.23 mol) with thorough mixing. The solution was poured into a plastic bag. The bag was sealed and heated at 50° C in a water bath for 2.0 hours with no change in appearance. KOH (0.11 g; o 0.002 mol; 1.0 mol% on VAc) was dissolved in 5 mL of methanol and added to the bag with thorough mixing. The bag was re-sealed and placed in the water bath at 50° C., immediately precipitating the polymer as a white rubbery slab. After 15 min., heating was discontinued and the slab was removed from the bag, mechanically ground, washed with methanol, decanted, then stored under fresh MeOH. Molecular weight measurements gave $\overline{M}n=23,000$, $\overline{M}w=44,000$ for PVOH/6% PNVF.

Slurry Hydrolysis of PVOH/6% PNVF to PVOH/6% PVAm. To a 100 mL round-bottom flask equipped with mechanical stirrer, heating mantle, N2 blanket, thermometer and thermowatch were added the PVOH/PNVF polymer and 75 mL of methanol. KOH (1.05 g; 0.0187 mol; 1.36 eq. on original NVF) was dissolved in 5 mL of methanol and added to the slurry. The slurry was heated with vigorous stirring at reflux (63° C) for 3.25 hours. Base consumption was monitored by potentiometric titration of 5 mL aliquots (MeOH-based solution) with approximately 0.1M HCl to pH TM 7. After heating for 3.25 hours, the slurry volume was low due to evaporation of methanol and removal of aliquots for titration. Heating was discontinued and the slurry was cooled overnight.

The following day. 50 mL of methanol was added. The slurry was reheated with vigorous stirring at reflux for 5 hours. Base consumption was monitored as above. The slurry was then cooled. filtered, washed with methanol and dried at 60° C under house vacuum to give 6.6 g of oven dried material. This product showed complete PVAc hydrolysis and 77% PNVF hydrolysis.

EXAMPLE III

This example demonstrates acetalization of PVOH/6% PVAm. To a 250 ml 3-neck round bottomed flask equipped with condenser, N2-inlet, thermometer, thermowatch, mechanical stirrer, and heating mantle were added butyraldehyde (4.53g), methanol (10g), and sulfuric acid (0.5g). While stirring, a PVOH/6%PVAm solution (10g in 80g of H2O) was added dropwise into the methanol solution. The resulting solution was heated to 65.C. for 1.5 hours. At end of the reaction, the aqueous polymer solution was cooled. The polymer products were precipitated by adjusting the solution pH to 10.5 with NaOH, and then were filtered, washed with H2O, and dried under vacuum (yield: 12.2g).

Product analysis was as follows:
$^1$H NMR (CD$_3$OD): δ0.95 (t, CH3, 0.84H), 1.57 (m, CH2, 3.1H), 3.90 and 4.05 (2 br. s, CHO2, 0.83H), 4.6 (br. s, CHO2, 0.2H), and 4.85 ppm (s, active H). This is consistent with formation of slightly less than the theoretical amount of acetal and aminal.

EXAMPLE IV

This example demonstrates acetalization of PVOH/12% PVAm. Following the procedures of Examples I and II and altering the reactant proportions, copolymer was made and hydrolyzed to contain PVOH and 12 mol percent PVAm which was reacted with butyraldehyde to form the acetal. To a 250 ml 3-neck round bottomed flask equipped with condenser, N2-inlet, thermometer, thermowatch, mechanical stirrer, and heating mantle were added butyraldehyde (4.53g), methanol (10g), and sulfuric acid (0.5g). While stirring, a PVOH/12%PVAm solution (10g in BOg of H2O) was added dropwise into the methanol solution. The resulting solution was heated to 65° C for 1.5 hours. At end of the reaction, the aqueous polymer emulsion was cooled. The polymer products were precipitated by adjusting the solution pH to 10.5 with NaOH and then were filtered, washed with H2O, and dried under vacuum (yield: 13.4g). Product analysis was as follows:

$^1$H NMR (CD$_3$OD): similar to Ex III except ratios are 0.84:2.7:0.8:0.1$_5$, i.e., consistent with high acetal and aminal formation. $^{13}$C NMR (DC$_3$OD) $\neq$14.5 (s, CH3), 18.5 (s, CH )

19.5 (s, CH$_2$), 38.5 (m, CH$_2$), 45 (m, PVOH CH ), 64–76 (m', CH), 88.7 (s, N—CH—N), 95.8 (s, N—CH—O), 102.6 ppm (s, O—CH—O). The ratios are consistent with approximately 50% of the OH and NH groups being tied up in acetal, hemiaminal and aminal forms in a ratio of 64:20:16 of each respectively.

EXAMPLE V

This example demonstrates acetalization of PVOH/1.2% PVAm. Following the procedures of Examples I and II and altering the reactant proportions, copolymer was made and hydrolyzed to contain PVOH and 1.2 mol percent PVAm which was reacted with butyraldehyde to form the acetal. To a 250 ml 3-neck round bottomed flask equipped with condenser, N$_2$-inlet, thermometer, thermowatch, mechanical stirrer, and heating mantle were added butyraldehyde (4.53g), methanol (10g), and sulfuric acid (0.5g). While stirring, a PVOH/1.2%PVAm solution (10g in 80g H 0) was added dropwise into the methanol solution. The resulting solution was heated to 65° C. for 1.5 hours. At end of the reaction, the aqueous polymer emulsion was cooled. The polymer products were precipitated by adjusting the solution pH to 10.5 with NaOH, and then were filtered, washed with H$_2$O, and dried under vacuum (yield: 11.3g).

This sample gave a similar NMR spectrum consistent with complete formation of acetal and aminal.

EXAMPLE VI

This example demonstrates acetalization of poly(-vinylamine). Poly(vinylamine) was made by homopolymerization of N-vinylformamide followed by hydrolysis to the amine. The acetal was prepared by reaction wi butyraldehyde. To a 250 ml 3-neck round bottomed flask equipped with condenser. N$_2$-inlet, thermometer, thermowatch, mechanic mantle were added butyraldehyde (4.53g), methanol (10g), and sulfuric acid (0.5g). While stirring, a PVAm solution (10g in 80g H$_2$O ) was added dropwise into the methanol solution. The resulting solution was heated to 65° C. for 1.5 hrs. At the end of the reaction, the aqueous polymer solution was cooled. The polymer products were precipitated by adjusting the solution pH to 10.5 with NaOH. and then were filtered, washed with H$_2$O, and dried under vacuum (yield: 8.6g).

The NMR was poorly resolved: $^1$H NMR (CD$_3$OD): δ0.95 (t, CH$_3$, 0.84H). ).6–2.5 (m, CH$_2$), 3.55 (m, CH), 3.95 (m. CH). 4.25 (m. CHN$_2$) 4.9 (active H) Integral ratios were consistent with high aminal formation efficiency.

EXAMPLE VII

This example demonstrates the exceptional performance of the polymers of the present invention as flocculants. To be effective as flocculants most prior art polymers must have high molecular weight, which causes difficulties in synthesis and application and also increases cost. The polymers of the present invention perform well even at low molecular weight, an unexpected and industrially valuable property.

The effect of poly(vinylamine)/poly(vinylbutylaminal) (30,000-40,000 MW) (curve A) according to the invention in flocculation of a standard suspension of bentonite clay was tested and compared to other polymers, namely polyacrylamide (6 million MW from Scientific Polymer Products) (curve poly(N-vinylformamide) (2.4 million MW) (curve C).

To 200 ml of a well-hydrated. 200 ppm stock suspension of bentonite in tap water, was added 50 ml of polymer solution (tap water). The concentration of added polymer solution was adjusted so that the polymer concentrations (dosages) in the complete system ranged from 0.01 to 100 ppm. This system was stirred for 13 minutes, followed by 10 minutes of settling. The turbidity of the supernatant was then measured (good flocculation gave a clear supernatant). The results are reported in the graph of the accompanying FIG.

From this data, a curve of turbidity (i.e., flocculating ability) vs. dosage was constructed. Polymer performance was evaluated on the basis of:
a. dosage at curve minimum.,
b. turbidity at curve minimum.,
c. curve width (good flocculation over a broad range is desirable).

From the results shown in the graph, it can be seen that the polymer of the present invention, even at low molecular weight, is a significantly better flocculant than the high molecular weight polyacrylamide, and as good as or better than the high molecular weight poly(N-vinylformamide).

Other aspects and embodiments of our invention will be apparent to those skilled in the art from the above disclosure without departing from the spirit or scope of our invention.

We claim:

1. An amine functional polyvinylacetal which is the reaction product of monoaldehyde and poly(vinylamine).

2. The polyvinylacetal of claim 1 wherein said aldehyde is selected from aliphatic aldehydes, aromatic aldehydes and substituted aromatic aldehydes.

3. The polyvinylacetal of claim 1 wherein said aldehyde is butyraldehyde or 2-ethylhexaldehyde.

4. An amine functional polymer containing acetal groups having monomeric units randomly joined in the proportions and structures indicated by the formula:

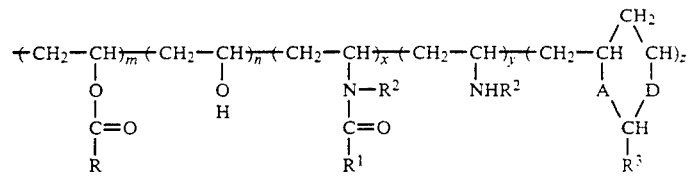

wherein m, n. x, y and z are integers which added together equal a sum.
m is 0 to 15 percent of said sum,
n is 0 to 94 percent of said sum,
x is 0 to 30 percent of said sum.
y is 1 to 95 percent of said sum,
z is 5 to 80 percent of said sum;
A and D are each O or $NR_2$
R is H, $C_1$-$C_{11}$ alkyl, phenyl or —$CF_3$,
$R^1$ is H or methyl,
$R^2$ is H or $C_1$-$C_{11}$ alkyl or hydroxyalkyl and
$R^3$ is H, Chd 1-$C_{20}$ alkyl, phenyl, or hydroxyphenyl 5. The polymer of claim 4 wherein
m is 0 to 2 percent of said sum, and
x is 0 to 4 percent of said sum.

6. The polymer of claim 5 wherein m and n are zero, A and D are NH, $R^1$ is H, $R^2$ is H and $R^3$ is alkyl.

7. The polymer of claim 6 wherein $R^3$ is propyl.

8. The polymer of claim 6 in the form of a cationic ammonium polyvinylacetal.

9. The amine functional polyvinylacetal of claim 1 which is the reaction product of monaldehyde and a copolymer of vinyl alcohol and vinylamine.

* * * * *